United States Patent [19]

Ueyama

[11] Patent Number: 4,729,644
[45] Date of Patent: Mar. 8, 1988

[54] ZOOM LENS ASSEMBLY

[75] Inventor: Masayuki Ueyama, Toyonaka, Japan

[73] Assignee: Minolta Camera Kabushiki Kaisha, Japan

[21] Appl. No.: 642,330

[22] Filed: Aug. 20, 1984

[30] Foreign Application Priority Data

Aug. 19, 1983 [JP] Japan .............................. 58-151985

[51] Int. Cl.$^4$ .............................................. G02B 15/00
[52] U.S. Cl. ................................................. 350/429
[58] Field of Search ................................. 350/429, 430

[56] References Cited

U.S. PATENT DOCUMENTS

| 4,198,126 | 4/1980 | Abe et al. ............................. | 350/430 |
| 4,315,670 | 2/1982 | Shigoku ............................... | 350/429 |
| 4,387,968 | 6/1983 | Sekiguchi ............................ | 350/429 |
| 4,439,019 | 3/1984 | Muryoi ................................. | 350/429 |
| 4,472,032 | 9/1984 | Kamata et al. ...................... | 350/429 |

Primary Examiner—John K. Corbin
Assistant Examiner—Loha Ben
Attorney, Agent, or Firm—Wolder, Gross & Yavner

[57] ABSTRACT

An interchangeable zoom lens assembly in which a part of the zooming lens groups is commonly used for focusing includes a stationary barrel to be mounted on a camera body, a cam ring fitted over or inside the stationary barrel, a manually operable zooming ring and a manually operable focusing ring. The cam ring is rotated relative to the stationary barrel in response to manual operation of the zooming ring and is moved relative to the stationary barrel in the direction of the optical axis of the zoom lens in response to manual operation of the focusing ring. A transmission mechanism moves the zooming lens groups for zooming in response to the rotation of the cam ring and to move the part of the zooming lens groups for focusing while keeping the remaining part of the zooming lens groups at rest in response to the movement of the cam ring in the direction of the optical axis. The focusing ring is located close to the rear end of the lens assembly and the lens assembly may further include a mechanism for automatically operating the focusing ring in response to a power drive from the camera body for automatic focusing or for power focusing.

13 Claims, 6 Drawing Figures

ZOOM LENS ASSEMBLY

BACKGROUND OF THE INVENTION

1. Field of the Invention

The present invention relates to a mechanism for moving lenses in a zoom lens assembly, and more particularly to a mechanism for moving a part of the zooming lens groups in response to a focusing operation, keeping the remaining part of the zooming lens groups at rest.

2. Description of the Prior Art

Prior zoom lenses are generally constructed such that the foremost lens group is moved along the optical axis for focusing. Where such a lens construction is incorporated in zoom lenses with high zoom ratio ranging to wide-angle, however, the brightness at the edge of the image field is reduced to a large extent and for this reason the lens diameter should be increased. Another problem is that aberrations differ widely dependent on the distance to the object. To solve the above problems, there has been proposed, for example by Japanese patent laid-open publication No. Sho. 57-37308 published on Mar. 1, 1982, a zoom lens having lens groups movable for zooming with part of the lens groups being also movable for focusing. With the proposed zoom lens, the lens groups are drivable by cam grooves provided in a member movable upon zooming, and some of the lens groups are adjustable by cam grooves provided in another member movable upon focusing. However, the proposed lens construction is complex since the separate members are necessary which are movable upon zooming and focusing, respectively, and a complicated holder mechanism is required for allowing those lens groups which are movable in both zooming and focusing modes to operate separately in those modes. In the zoom lenses with high zoom ratio ranging to wide-angle, the lens elements should be installed with high accuracy. With the complex prior art arrangement, however, no desired high accuracy can be achieved as the lens groups are increasingly inclined and off center.

In case the lens groups that are movable in the focusing mode are located close to the front end of the lens assembly, the members used for focusing the lens groups are also disposed close to the front end of the lens assembly. Where such lens is adapted to effect focusing by an automatic focusing mechanism positioned in a camera body as proposed in recent years, certain shortcomings arise. Specifically, the focusing members located close to the front end of the lens assembly are remote from the camera body, and a connector by which the focusing members and the automatic focusing mechanism in the camera body are operatively interconnected takes up a large space. In addition, the accuracy with which driving movement is transmitted from the automatic focusing mechanism to the focusing members is low. It is therefore preferable that the focusing members be located close to the rear end of the lens assembly. Nevertheless, no accurate and sufficient driving force can be transmitted from the rearward located focusing members to the focusing ens groups if the focusing lens groups remain positioned close to the front end of the lens assembly.

SUMMARY OF THE INVENTION

It is an object of the present invention to provide a simple and highly accurate zoom lens assembly for allowing part of lens groups movable upon zooming to be movable upon focusing.

Another object of the invention is to provide a zoom lens assembly for facilitating automatic focusing by an automatic focusing mechanism positioned in a camera body.

According to the present invention, a zoom lens assembly has a movable ring fitted over a stationary barrel and rotatable and movable in a direction parallel to an optical axis, a zooming barrel for effecting zooming, a focusing barrel for effecting focusing, first and second means for transmitting movements of the zooming and focusing barrels to the movable barrel without mutual interference, a zooming mechanism for moving zooming lens groups when the movable barrel is rotated upon zooming, and a focusing mechanism for moving only focusing lens groups while preventing those lens groups which are moved only upon zooming when the movable barrel is moved parallel to the optical axis upon focusing.

Zooming and focusing can be effected by way of the single movable barrel. The zoom lens assembly is therefore simple in construction and its components are positioned with high accuracy.

Since the lens groups which are moved only upon zooming are not affected by focusing, a focusing barrel can be located closely to a camera body irrespectively of the position in which the lens groups used for focusing are located. This allows a small installation space for a mechanism employed for automatically operating the focusing barrel from the side of the camera body, and also results in an increased accuracy with which the force is transmitted from the camera through the mechanism.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Figure 1:
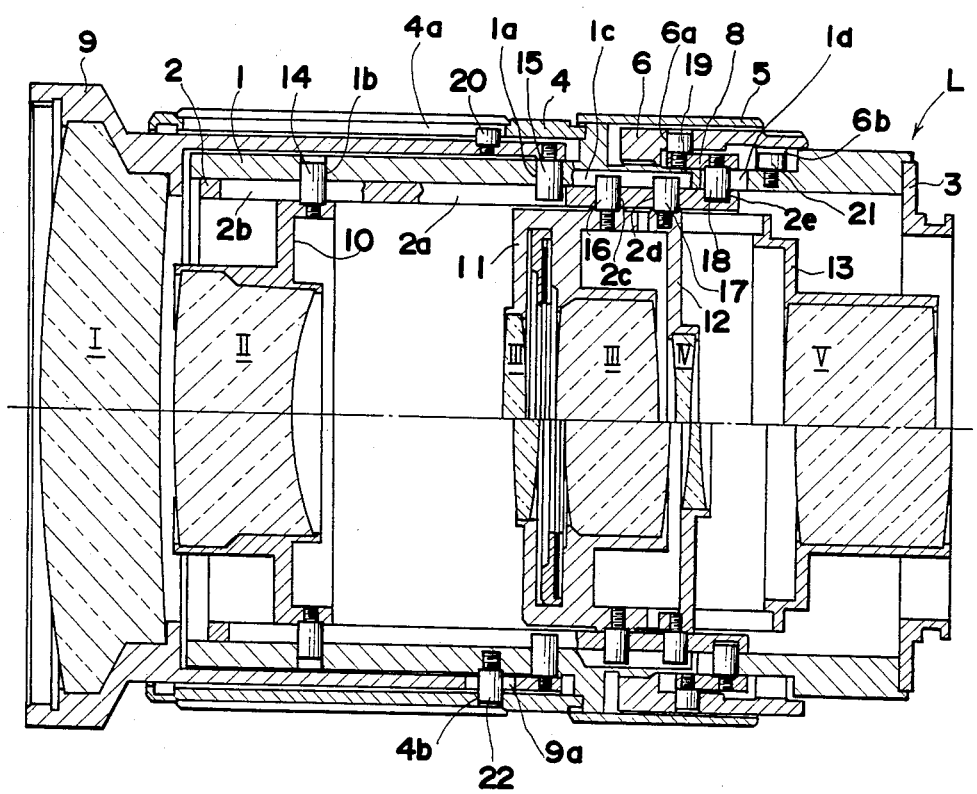
FIG. 1 is a cross-sectional view of a zoom lens assembly according to a first embodiment of the present invention.
Figure 2:
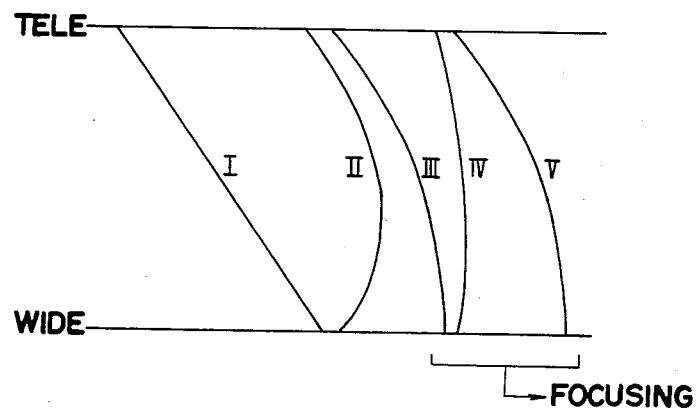
FIG. 2 is a diagram showing the movements of the respective lens groups in the zoom lens assembly of FIG. 1 upon zooming.
Figure 3:
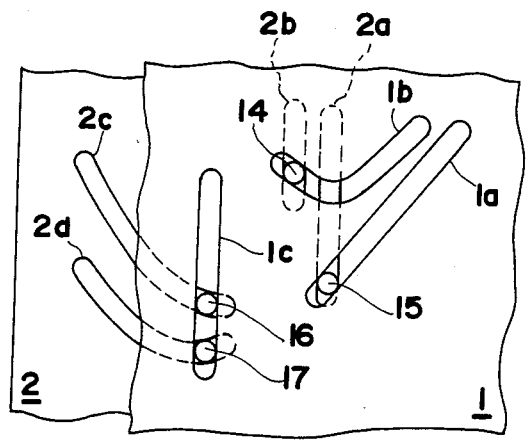
FIG. 3 is a fragmentary developed view of a portion of the zoom lens assembly of FIG. 1.

A zoom lens assembly according to a first embodiment of the present invention is illustrated in FIGS. 1 through 3. The zoom lens assembly is designed as an interchangeable zoom lens assembly L which is shown in cross section in FIG. 1. The interchangeable lens L is illustrated in its upper half (above an optical axis) as being focused at an infinite distance with a short focal length, and in its lower half (below the optical axis) as being focused at a shortest distance with a short focal length. The interchangeable lens assembly L has first through fifth lens groups I, II, III, IV, and V in order successively from the front end (lefthand side end as shown) of the lens assembly L, each lens group composed of one or a plurality of lenses. The interchangeable lens assembly L can be zoomed by moving the first lens group I through the fifth lens group V, and can be focused by moving the third lens group III through the fifth lens group V. The lens groups I through V are retained by first through fifth movable frames 9, 10, 11, 12 and 13, respectively.

The interchangeable lens assembly L has a mount member 3 for being mounted on a camera body (not shown) and a stationary barrel 1 integrally secured to the mount member 3 and immovable with respect to the camera body on which the lens assembly L is mounted. The stationary barrel 1 has first and second cam grooves 1a, 1b and first and second axial straight grooves 1c, 1d which extend in the direction of the optical axis of the lens groups I through V. The stationary barrel 1 has pins 21, 22 partly embedded in and projecting radially outwardly from an outer peripheral surface thereof.

The first movable frame 9 is fitted over the stationary barrel 1 and located at the front end of the interchangeable lens assembly L. The first movable frame 9 has a clear recess 9a through which the pin 22 on the stationary barrel 1 extends, and a pin 15 partly embedded in and projecting radially inwardly from an inner peripheral surface thereof through the first cam groove 1a in the stationary barrel 1. The first movable frame 9 also has an additional pin 20 partly embedded in and projecting radially outwardly from an outer peripheral surface thereof.

A zoom ring 4 is fitted over the first movable frame 9 and has a circumferential slot 4b in which is fitted the pin 22 projecting from the stationary barrel 1 through the clear recess 9a in the first movable frame 9. The zoom ring 4 also has an axial straight groove 4a extending in the direction of the optical axis, with the pin 20 on the first movable frame 9 being fitted in the straight groove 4a.

Focusing rings 6, 8 are fitted over the stationary barrel 1 at the position close to the rear end of the interchangeable lens assembly L. The focusing ring 6 has an internally threaded inner peripheral surface held in mesh with an externally threaded outer peripheral surface of the stationary barrel 1. The focusing ring 6 is radially spaced from the stationary barrel 1 by a gap offset from the threaded peripheral surfaces, with the pin 21 disposed in the gap. A projection 6b projects radially inwardly from an inner peripheral surface of the focusing ring 6 for abutment against the pin 21. The focusing ring 6 is angularly movable for a certain angular interval without being engaged by the pin 21, but will be stopped against rotation upon engagement between the pin 21 and the projection 6b when the focusing ring 6 has angularly moved the angular interval. The focusing ring 6 has a cam groove 6a.

The focusing ring 8 is interposed between the focusing ring 6 and the stationary barrel 1 and has radially inward and outward pins 18, 19 partly embedded therein. The radially outward pin 19 is fitted in the cam groove 6a in the focusing ring 6 and the radially inward pin 18 extends through the second axial straight groove 1d in the stationary barrel 1.

A cam ring 2 is fitted in the stationary barrel 1 for movement both in the direction of the optical axis and in the circumferential direction. The cam ring 2 has a first axial straight groove 2a, a second axial straight groove 2b, a first cam groove 2c, a second cam groove 2d, and a circumferential groove 2e. The pin 15 projecting from the first movable frame 9 through the first cam groove 1a in the stationary barrel 1 is fitted in the first axial straight groove 2a. A pin 14 projects radially outwardly from the second movable frame 10 through the second axial straight groove 2b and is fitted in the second cam groove 1b in the stationary barrel 1. A pin 16 projects radially outwardly from the third movable frame 11 through the first cam groove 2c in the cam ring 2. A pin 17 projects radially outwardly from the fourth movable frame 12 through the second cam groove 2d in the cam ring 2. The pins 16, 17 are fitted in the first axial straight groove 1c in the stationary barrel 1. The fifth movable frame 13 and the third movable frame 11 are integrally retained with respect to each other. A pointer mark ring 5 has a focal length pointer mark on an outer surface thereof for coaction with graduations on the zoom ring 4 in letting the user known the adjusted focal length. The focusing ring 6 has on an outer surface distance graduations which can be seen through a window (not shown) in the pointer mark ring 5 for allowing the user to know the adjusted camera-to-object distance.

FIG. 2 illustrates movements of the lens groups I through V upon zooming of the interchangeable lens assembly L of the foregoing construction. FIG. 3 fragmentarily shows in a developed arrangement the fixed barrel 1 and the cam ring 2 for explaining movements of the lens groups upon focusing and zooming of the interchangeable lens assembly L. The upper side of FIG. 3 corresponds to the front side of the interchangeable lens assembly L or the lefthand side of FIG. 1.

Zooming of the interchangeable lens assembly L will hereinafter be described with reference to FIGS. 1 through 3. It is assumed that the interchangeable lens assembly L is set to a short focal length at first. The zoom ring 4 is rotated to effect zooming. The zoom ring 4 is guided by the pin 22 fitted in the circumferential slot 4b to rotate only, but not to move in the direction of the optical axis. The rotation of the zoom ring 4 causes the first movable frame 9 and the pin 15 to rotate through the pin 20 fitted in the straight groove 4a. The pin 15 is moved to the right from the position of FIG. 3 and to the front end of the interchangeable lens assembly L while being guided by the first cam groove 1a in the stationary barrel 1. Therefore, the first movable frame 9 is moved in the forward direction while being rotated.

As the pin 15 rotates, the cam ring 2 is also rotated by the first axial straight groove 2a. The rotation of the cam ring 2 causes the second axial straight groove 2b in the cam ring 2 to move with respect to the second cam groove 1b in the stationary barrel 1, whereupon the pin 14 is driven to move the second movable frame 10. The rotation of the cam ring 2 also causes the first and second cam grooves 2c, 2d in the cam ring 2 to move with respect to the first axial straight groove 1c in the stationary barrel 1, whereupon the pins 16, 17 are driven to move the third through fifth movable frames 11, 12, 13.

Thus zooming is effected from the short focal length toward a long focal length. The first, third, and fifth lens groups I, III, and V are advanced, while the second and fourth lens groups II, IV are initially retracted and then advanced. During the rotation of the cam ring 2 relative to the stationary barrel 1 the circumferential groove 2e is rotatable freely relative to the pin 18, so that the focusing rings 6, 8 are held at rest together with the stationary barrel 1.

Focusing will now be described. The focusing ring 6 is first rotated. Since the focusing ring 6 is threadedly coupled with the stationary barrel 1, the focusing ring 6 is moved in the direction of the optical axis by the lead of the threads. As the focusing ring 6 is thus rotated and moved in the direction of the optical axis, the pin 19 on the focusing ring 8 is driven by the cam groove 6a, and the pin 18 is guided by the second axial straight groove 1d in the stationary barrel 1 so as to move rectilinearly. Since the pin 18 engages in the circumferential groove 2e in the cam ring 2, the cam ring 2 is also driven to move rectilinearly in the direction of the optical axis.

Upon straight movement of the cam ring 2, the first and second cam grooves 2c, 2d therein cause the pin 16, 17 to move in the direction of the optical axis by being guided by the first axial straight groove 1c in the stationary barrel 1 for moving the third, fourth, and fifth movable frames 11, 12, and 13 to effect focusing. The first and second movable frames 9, 10 remain immovable as the pins 15, 14 fitted in the first and second axial straight grooves 2a, 2b are not driven while the cam ring 2 is moved rectilinearly in the direction of the optical axis.

With the foregoing embodiment, the cam ring 2 is both rotatable and movable in the direction of the optical axis with respect to the stationary barrel 1, and the axial straight grooves 1c, 1d, 2a, 2b and the cam grooves 1a, 1b, 2c, 2d are formed in the stationary barrel 1 and the cam ring 2. As a result, by selectively rotating the cam ring 2 or moving the same in the direction of the optical axis, the movable frames holding the lens groups can be moved differently dependent on the direction in which the cam ring 2 is moved.

Figure 4:
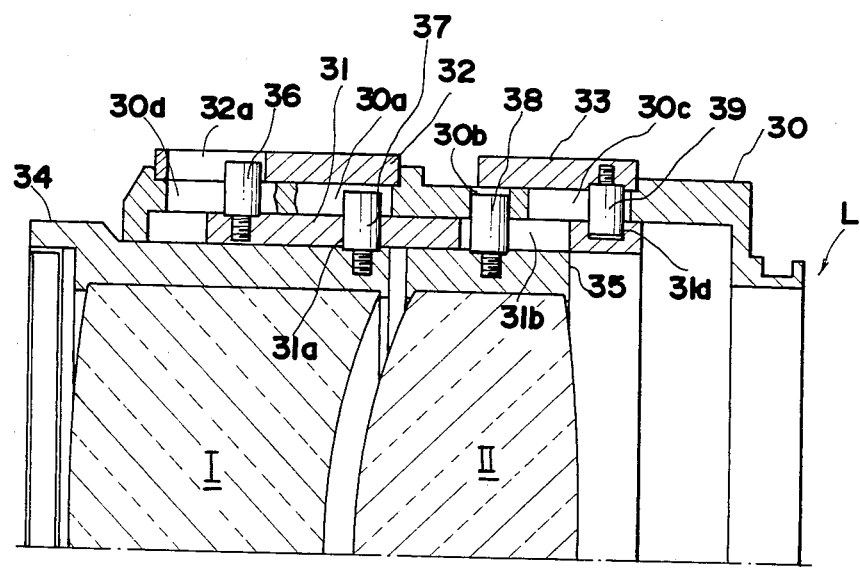
FIG. 4 is a fragmentary cross-sectional view of a half of a zoom lens assembly according to a second embodiment of the present invention.

FIG. 4 shows a zoom lens assembly according to a second embodiment, the zoom lens assembly being designed as an interchangeable lens assembly L. The interchangeable lens assembly L has first and second lens groups I, II each composed of one or a plurality of lenses. The first and second lens groups I, II are independently movable for zooming, and only the first lens group I is movable for focusing. The lens groups I, II are held by first and second movable frames 34, 35, respectively.

The interchangeable lens assembly L has a stationary barrel 30 integral with a mount portion for being mounted on a camera body, the stationary barrel 30 being immovable with respect to the camera body. The stationary barrel 30 has first and second axial straight grooves 30a, 30c extending in the direction of the optical axis of the lens groups I, II, a cam groove 30b, and a clear hole 30d.

A zoom ring 32 is fitted over the stationary barrel 30 close to the front end of the interchangeable lens L, the zoom ring 32 having an axial straight groove 32a. A focusing ring 33 is fitted over the stationary barrel 30 close to the rear end of the interchangeable lens L. A pin 39 is partly embedded in and projects radially inwardly from an inner peripheral surface of the focusing ring 33, the pin 39 extending through the second axial straight groove 30c in the stationary barrel 30.

A cam ring 31 is fitted in the stationary barrel 30 for movement both in the direction of the optical axis and in the circumferential direction. The cam ring 31 has a cam groove 31a, an axial straight groove 31b, and a circumferential groove 31d. The pin 39 has a radially inwardly end fitted in the circumferential groove 31d. A pin 36 is partly embedded in and projects radially outwardly from an outer peripheral surface of the cam ring 31. The pin 36 extends through the clear hole 30d in the stationary barrel 30 and has a radially outward distal end fitted in the axial straight groove 32a in the zoom ring 32. A pin 37 projects from the first movable frame 34 through the cam groove 31a and has a radially outward distal end fitted in the first straight groove 30a in the stationary barrel 30. A pin 38 projects from the second movable frame 35 through the axial straight groove 31b in the cam ring 31 and has a radially outward distal end fitted in the cam groove 30b in the stationary barrel 30.

For zooming, the zoom ring 32 is rotated to cause the cam ring 31 to rotate therewith through the axial straight groove 32a and the pin 36. The rotation of the cam ring 31 causes the cam groove 31a to move relative to the first axial straight groove 30a in the fixed barrel 30, driving the pin 37 to move the first movable frame 34. Likewise, the rotation of the cam ring 31 causes the axial straight groove 31b to move relative to the cam groove 30b in the stationary barrel 30, driving the pin 38 to move the second movable frame 35. The first and second lens groups I, II are now moved to effect zooming.

Focusing is carried out by moving the focusing ring 33 in the direction of the optical axis. Upon movement of the focusing ring 33, the pin 39 is moved in and along the second straight groove 30c in the stationary barrel 30, and the cam ring 31 is moved in the direction of the optical axis by being driven by the circumferential groove 31d in which the pin 39 is fitted. The movement of the cam ring 31 causes the cam groove 31a to move with respect to the first axial straight groove 30a in the stationary barrel 30, whereupon the pin 37 is driven to move the first movable frame 34 for focusing. The second movable frame 35 remains at rest since the pin 38 fitted in the axial straight groove 31b in the cam ring 31 is not driven when the cam ring 31 is moved rectilinearly in the direction of the optical axis. When the cam groove 31a in the cam ring 31 is rotated relative to the first axial straight groove 30a in the stationary barrel 30 in the zooming mode, it is possible for the cam ring 31 and the focusing ring 33 to accidentally move in the direction of the optical axis. However, such movement is prevented by keeping the focusing ring 33 and the stationary barrel 30 in appropriate frictional engagement.

According to the second embodiment, as with the first embodiment, the movable frames supporting the lens groups, respectively, can be moved differently by selectively rotating the cam ring or moving the same in the direction of the optical axis.

Figure 5:
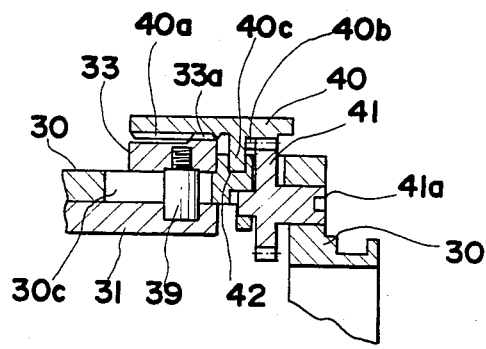
FIG. 5 is a fragmentary cross-section view of a portion of a zoom lens assembly according to a third embodiment of the present invention.

FIG. 5 shows an arrangement of a third embodiment in which a mechaism for enabling automatic focusing from the side of a camera body is incorporated in the lens assembly according to the second embodiment. The construction of FIG. 5 is substantially the same as that of FIG. 4, but differs therefrom as follows: A focusing ring 33 has an externally threaded outer peripheral surface 33a held in mesh with an internally threaded inner peripheral surface 40a of a manual control focusing ring 40 fitted over the focusing ring 33. The manual control focusing ring 40 has a radially inward flange 40c fitted in a circumferential groove 42 defined in an outer peripheral surface of a stationary barrel 30, thus preventing the manual control focusing ring 40 from moving in the direction of the optical axis.

The manual control focusing ring 40 has gear teeth 40b on its inner peripheral surface. A gear 41 is mounted on the stationary barrel 30 and held in mesh with the gear teeth 40b of the manual control focusing ring 40. The gear 41 has a rotatable shaft serving as a follower 41a reaching a mount surface of the stationary barrel 30 which will be held against a camera body when the interchangeable lens is attached to the camera body.

Focusing operation of the lens shown in FIG. 5 is as follows: Where there is no automatic focusing mechanism in the camera body, the manual control focusing ring 40 is rotated to move the focusing ring 33 meshing with the manual control focusing ring 40 in the direction of the optical axis by the lead of threads. The pin 39 and the cam ring 31 are moved in the direction of the optical axis by being guided by the second axial straight groove 30c in the stationary barrel 30 for focusing the lens in the same manner as that according to the second embodiment.

In case the camera body has an automatic focusing mechanism (not shown), a drive shaft (not shown) of the automatic focusing mechanism is coupled with the follower 41a of the gear 41 when the interchangeable lens assembly L is attached to the camera body. When the drive shaft is rotated by a motor (not shown) of the automatic focusing mechanism in the camera body, the gear 41 is rotated to rotate the manual control focusing ring 40 for focusing operation in the same manner as that by the manual focusing operation as described above. Although the focusing mode has been described as being effected by the automatic focusing mechanism in the camera body, the present invention is equally applicable to the case where the camera body is provided with a so-called power focusing mechanism in which focusing is motor-controlled by the user who opens and closes the motor drive circuit in the camera body as desired.

In the embodiment shown in FIG. 5, the manual control focusing ring 40 is located close to the rear end of the interchangeable lens assembly. Therefore, the manual focusing ring can easily be controlled by a powered drive mechanism such as an automatic focusing mechanism and a so called power focusing mechanism.

The zooming mode of operation of the arrangement of FIG. 5 is the same as that of the second embodiment, and will not be described. In the embodiment of FIG. 5, the focusing ring 33 is prevented from moving in the direction of the optical axis by the circumferential groove 42 in the stationary barrel 30, the flange 40c and the internal threads 40a of the manual control focusing ring 40, and the external threads 33a of the focusing ring 33. Accordingly, it is not necessary to keep the focusing ring 33 and the stationary barrel in frictional engagement as with the second embodiment.

Figure 6:
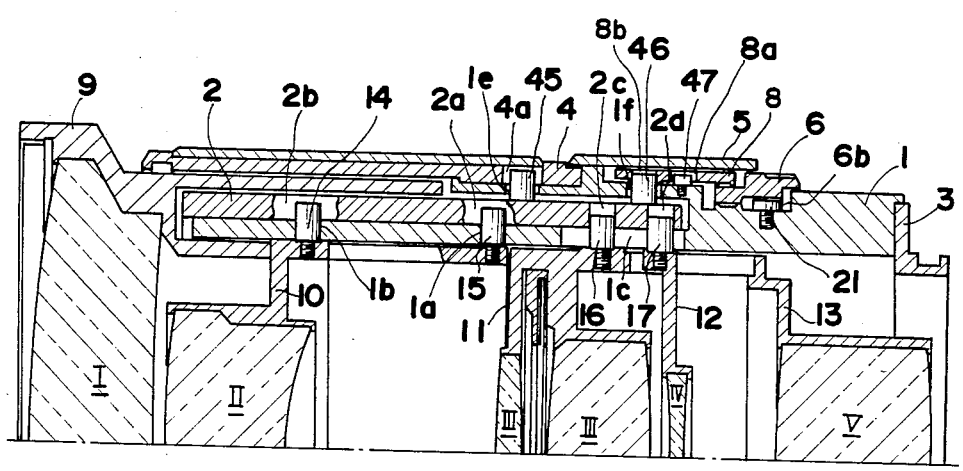
FIG. 6 is a cross-sectional view of a half of a zoom lens assembly according to a fourth embodiment of the present invention.

FIG. 6 illustrates a zoom lens assembly according to a fourth embodiment of the present invention. The stationary barrel 1 and the cam ring 2 shown in FIG. 6 are positioned in inverse relation to those shown in FIGS. 1 through 3, that is, the cam ring 2 is fitted over the stationary barrel 1. The first movable frame 9 supporting the first lens group I is fitted in the stationary barrel 1. Thus, the first movable frame 9, the stationary barrel 1, and the cam ring 2 are connected in the same manner as with the first embodiment, except that they are disposed in radially inverse relation. The first movable frame 9 and the zoom ring 4 are not directly connected unlike the first embodiment. A pin 45 projects radially outwardly from the cam ring 2 and is fitted in the axial straight groove 4a in the zoom ring 4. The stationary barrel 1 has a clear hole 1e therein for preventing a portion of the stationary barrel 1 extending to retain the zoom ring 4 from blocking movement of the pin 45.

A pin 46 projects radially outwardly from the cam ring 2 and is fitted in a circumferential groove 8b in the focusing ring 8. The stationary barrel 1 also has a clear hole 1f through which the pin 46 extends.

The focusing ring 8 has an axial straight groove 8a in which is fitted a pin 47 projecting from the stationary barrel 1. The focusing ring 8 has an internally threaded innner peripheral surface held in mesh with an externally threaded outer peripheral surface of the focusing ring 6. The focusing ring 6 is held in mesh with the stationary barrel 1 as with the first embodiment.

The stationary barrel 1, the cam ring 2, and the second, third and fourth movable frames 10, 11, 12 are connected in the same manner as those in the first embodiment.

For zooming, the zoom ring 4 is rotated to rotate the pin 45 therewith for thereby rotating the cam ring 2. The rotation of the cam ring 2 relative to the stationary barrel 1 drives the pins 14, 15, 16, and 17 to move the first through fifth movable frames 9, 10, 11, 12 and 13.

For focusing, the focusing ring 6 is rotated while being moved in the direction of the optical axis by the lead of threads through which the focusing ring 6 is coupled to the stationary barrel 1. The rotation of the focusing ring 6 as it also moves in the direction of the optical axis is transmitted to the focusing ring 8. However, since the focusing ring 8 is prevented from rotation by the pin 47 fitted in the axial straight groove 8a, the focusing ring 8 is moved only in the direction of the optical axis by the lead of threads through which the focusing ring 8 is coupled to the focusing ring 6. The movement of the focusing ring 8 drives the pin 46 in the direction of the optical axis to move the cam ring 2 in the direction of the optical axis. As the cam ring 2 is moved in the direction of the optical axis, the pins 16, 17 fitted in the cam grooves 2c, 2d in the cam ring 2 is moved in the same direction. Thus the third, fourth, and fifth movable frames 11, 12, and 13 are moved in the direction of the optical axis. The first and second movable frames 9, 10 remain at rest since the pins 15, 14 fitted in the straight grooves 2a, 2b in the cam ring 2 are held at rest, as with the first embodiment.

Although certain preferred embodiments have been shown and described, the present invention should not be interpreted as being limited to the illustrated embodiments, but may be arranged in various manners as desired dependent on the optical system constructions.

The mechanism driven by the automatic focusing mechanism in the camera body according to the third embodiment may be incorporated in the arrangements of the first and fourth embodiments in which the focusing ring 6 is located close to the rear end of the lens assembly.

What is claimed is:

1. A zoom lens assembly for a zoom lens in which a part of the zooming lens groups is commonly used for focusing, said lens assembly comprising:
   a stationary barrel;
   a cam ring movable relative to said stationary barrel in the direction of the optical axis of said zoom lens and also rotatable relative to said stationary barrel;
   a manually operable zooming member;

a manually operable focusing member;

first transmission means for rotating said cam ring in response to manual operation of said zooming member;

second transmission means for moving said cam ring in the direction of said optical axis in response to manual operation of said focusing member; and third transmission means for moving said zooming lens groups for zooming in response to the rotation of said cam ring and for moving said part of said zooming lens groups for focusing while keeping the remaining part of said zooming lens groups at rest in response to the movement of said cam ring in the direction of said optical axis.

2. A zoom lens assembly as recited in claim 1, wherein said focusing member is located close to the rear end of said lens assembly.

3. A zoom lens assembly as recited in claim 2, wherein said lens assembly is an interchangeable lens assembly in which said stationary barrel has a mount portion which is to be mounted on a camera body.

4. A zoom lens assembly as recited in claim 3, further comprising a mechanism for automatically operating said focusing member, said mechanism including a shaft member driven for rotation from the rear side of said mount portion and fourth transmission means for operating said focusing member in response to the rotation of said shaft member.

5. A zoom lens assembly as recited in claim 1, wherein said third transmission means includes a plurality of combinations of an axial groove extending in the direction of said optical axis, a cam groove and a pin slidably fitted in said axial groove and said cam groove, said combinations respectively being operatively associated with said zooming lens groups and said cam ring such that all of said combinations operate to move said zooming lens groups for zooming in response to the rotation of said cam ring and such that only a part of said combinations operate to move said part of said zooming lens groups for focusing in response to the movement of said cam ring in the direction of said optical axis.

6. A zoom lens assembly as recited in claim 1, wherein said zooming member includes a rotatable member fitted over said stationary barrel to be manually rotated, and said first transmission means includes means for rotating said cam ring in response to the rotation of said rotatable member.

7. A zooming lens assembly as recited in claim 6, wherein said focusing member includes an axially movable member fitted over said stationary barrel and manually movable in the direction of said optical axis, and said second transmission means includes means for moving said cam ring in the direction of said optical axis in response to the movement of said axially movable member in the same direction.

8. A zoom lens assembly as recited in claim 6, wherein said focusing member includes a second manually rotatable member fitted over said stationary barrel, and said second transmission means includes means for moving said cam ring in the direction of said optical axis in response to the rotation of said second rotatable member.

9. A zoom lens assembly as recited in claim 6, wherein said means for rotating said cam ring in response to the rotation of said rotatable member includes a combination of an axial groove extending in the direction of said optical axis, a cam groove and a pin slidably fitted in said axial groove and said cam groove and said third transmission means includes said combination as means for moving one of said zooming lens groups which is included in said remaining part in response to the rotation of said cam ring.

10. A lens assembly comprising a barrel assembly and a plurality of coaxial longitudinally spaced lens groups carried by said barrel assembly the improvement wherein said barrel assembly includes:

mutually telescoping coaxial first and second barrel sections, said first barrel section being formed in an integral unit and being rotatable and axially movable relative to said second barrel section;

first and second operating means for respectively axially moving and rotating said first barrel section; and motion transmission means including pairs of overcrossing guideways located on said first and second barrel sections and a follower movable with each lens group and movably engaging respective pair of said guideways at their overcrossing, at least one of said guideways on said first barrel section extending parallel to the barrel longitudinal axis thereby being responsive to the relative rotation of said first barrel section for axially moving all of said lens groups in a predetermined movement relationship, and being responsive to the axial movement of said first barrel section for axially moving only some of said lens groups while leaving the other of said lens groups axially stationary.

11. The lens assembly of claim 10 further comprising first and second control members drive coupled to said first barrel section, said first barrel section being rotated and axially shifted in response to the manipulation of said first and second control members respectively.

12. The lens assembly of claim 10 wherein said second barrel section defines a stationary barrel section and includes proximate its rear means for mounting said second barrel section to a camera body.

13. The lens assembly of claim 10 wherein said axial movement of said lens groups varies the focal length of said lens assembly and the axial movement of only some of said lens groups while maintaining the other lens groups stationary varies the focus of said lens assembly.

* * * * *